(12) United States Patent
Whitlow et al.

(10) Patent No.: US 8,604,942 B2
(45) Date of Patent: Dec. 10, 2013

(54) SYSTEM AND METHOD FOR DISPLAYING A VELOCITY RATE-OF-CHANGE INDICATOR

(75) Inventors: Stephen Whitlow, St. Louis Park, MN (US); Jan Flasar, Brno (CZ); Trent Reusser, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 13/291,299

(22) Filed: Nov. 8, 2011

(65) Prior Publication Data

US 2013/0113635 A1 May 9, 2013

(51) Int. Cl.
*G08B 21/00* (2006.01)

(52) U.S. Cl.
USPC ........... 340/961; 340/969; 340/971; 340/973; 340/978; 340/980; 701/7; 701/9; 701/14; 701/301; 701/120; 701/121

(58) Field of Classification Search
USPC ......... 340/961, 963, 969, 971, 973, 978, 980; 701/7, 9, 14, 120, 121, 301; 342/29, 342/30, 36, 38
See application file for complete search history.

(56) References Cited

U.S. PATENT DOCUMENTS

| | | | |
|---|---|---|---|
| 6,107,493 A | 8/2000 | Pohl et al. | |
| 6,271,768 B1 | 8/2001 | Frazier, Jr. et al. | |
| 6,744,396 B2 | 6/2004 | Stone et al. | |
| 7,212,920 B1 | 5/2007 | Bailey et al. | |
| 7,570,178 B1 | 8/2009 | Whalen et al. | |
| 7,908,978 B1 | 3/2011 | Pelton, Jr. | |
| 2003/0137444 A1 | 7/2003 | Stone et al. | |
| 2005/0237226 A1* | 10/2005 | Judge et al. | 340/946 |
| 2009/0088972 A1 | 4/2009 | Bushnell | |
| 2011/0066362 A1 | 3/2011 | He | |
| 2011/0121998 A1 | 5/2011 | Glover | |
| 2011/0270473 A1 | 11/2011 | Reynolds et al. | |

OTHER PUBLICATIONS

EP Communication, EP 12191344.6-1557 dated Mar. 19, 2013.
EP Communication dated Feb. 28, 2013 for EP 12 191 344.6.
EP Communication, EP 12 191 344.6 dated Jul. 15, 2013.

* cited by examiner

*Primary Examiner* — Brent Swarthout

(74) *Attorney, Agent, or Firm* — Ingrassia Fisher & Lorenz, P.C.

(57) ABSTRACT

Avionics display system is provided for deployment onboard an aircraft and includes an air traffic data source that provides the avionics display system with data indicative of at least position and velocity of a neighboring aircraft. The system comprises a cockpit display system, and a monitor included within the cockpit display system. The cockpit display system receives and displays position and velocity data pertaining to the neighboring aircraft on the cockpit monitor as a position symbol and a velocity vector graphic. A processor operatively coupled to the monitor is configured to generate an air traffic display on the monitor including symbology indicative of (1) the current position of the neighboring aircraft (2) a velocity of the neighboring aircraft, and (3) the rate-of-change of the velocity of the neighboring aircraft.

10 Claims, 9 Drawing Sheets

FIG. 6

SYSTEM AND METHOD FOR DISPLAYING A VELOCITY RATE-OF-CHANGE INDICATOR

TECHNICAL FIELD

Embodiments of the subject matter described herein relate generally to vehicular display systems and, more particularly, to an avionics display system for visually expressing flight information on a host aircraft that pertains to the position, velocity and velocity rate-of-change, of a neighboring aircraft.

BACKGROUND

Advances in aircraft surveillance technology, such as Automatic Dependent Surveillance-Broadcast (ADS-B), support a number of airborne and ground applications; e.g. CDTI (Cockpit Display of Traffic Information) and ACAS (Airborne Collision Avoidance). Among other things, ADS-B provides traffic position and velocity data that can be processed to present a velocity vector associated with a target or neighboring aircraft; i.e. display a line that extends from the displayed traffic symbology and represents the horizontal position of the neighboring aircraft in fifteen seconds. Such traffic data may be presented to one or more onboard displays including, but not limited to, a primary flight display, a multifunction display, and/or navigation display in a top-down, moving map format.

CDTI is just one tool that pilots utilize to update and maintain their situational awareness; however, they are primarily expected to maintain an active out-the-window scanning activity. Thus, pilots will not attend the CDTI for extended periods of time, but will sample the information only periodically. Therefore, the informational display format should be such as to present the information in a manner that promotes at-a-glance situational awareness.

Typically, the above referenced velocity vector represents the momentary velocity corresponding to the most recent sample from the ADS-B system. However, the velocity vector does not indicate whether the traffic target is accelerating, decelerating, or maintaining a substantially constant velocity. Therefore, when a pilot only briefly reviews the CDTI, it is difficult for the pilot to discern if the target is rapidly accelerating (as would be the case when, for example, an aircraft is taking off) or rapidly decelerating (as would be the case when an aircraft has just landed). Thus, in order to accurately predict the relative position of a given traffic target, a pilot would be required to track the target on the CDTI to determine the rate-of-change of the target's velocity (i.e. its acceleration or deceleration). The amount of pilot attention this would require and the time consumed thereby are excessive given the pilot's priority for out-the-window scanning in the terminal area.

Accordingly, it is desirable to provide a system and method for displaying that enables a pilot to rapidly discern not only the horizontal position of a neighboring aircraft and its projected position in fifteen seconds, but also provide an indication of the stability of the neighboring aircraft's velocity vector.

It is also desirable to provide a system and method for displaying a graphical indicator that enables a pilot to efficiently discern whether the velocity vector associated with a neighboring aircraft is stable, increasing, or decreasing.

BRIEF SUMMARY

A method is provided suitable for displaying the velocity rate-of-change of at least one neighboring aircraft on a cockpit monitor included within the cockpit display system of a host aircraft. The cockpit display system receives and displays position and velocity data pertaining to the neighboring aircraft on the cockpit monitor as a position symbol and a velocity vector graphic, respectively. In one embodiment, the method includes the steps of determining the velocity rate-of-change of the neighboring aircraft, and generating velocity rate-of-change symbology on the cockpit monitor proximate the velocity vector.

A method is also provided and is carried out by a cockpit display system including a cockpit monitor. In one embodiment, the method includes the steps of receiving air traffic data from at least one air traffic data source indicative of the position and velocity of at least one neighboring aircraft, determining the velocity rate-of-change of the neighboring aircraft from the air traffic data, and generating an air traffic display on the cockpit monitor including symbology indicative of the current position of the neighboring aircraft, the velocity vector of the neighboring aircraft, and the rate-of-change of the velocity vector of the neighboring aircraft.

Further, an avionics display system is provided for deployment onboard an aircraft and includes an air traffic data source that provides the avionics display system with data indicative of at least position and velocity of a neighboring aircraft. The system comprises a cockpit display system and a monitor included within the cockpit display system. The cockpit display system receives and displays position and velocity data pertaining to the neighboring aircraft on the cockpit monitor as a position symbol and a velocity vector graphic. A processor is operatively coupled to the monitor and is configured to generate an air traffic display on the monitor including symbology indicative of (1) the current position of the neighboring aircraft, (2) the velocity vector of the neighboring aircraft, and (3) the rate-of-change of the velocity of the neighboring aircraft.

BRIEF DESCRIPTION OF THE DRAWINGS

A more complete understanding of the subject matter may be derived from the following detailed description taken in conjunction with the accompanying drawings, wherein, like reference numerals denote like elements, and:

FIG. 6 illustrates an embodiment of a fourth symbology scheme for graphically displaying a velocity rate-of-change graphic on a display;

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
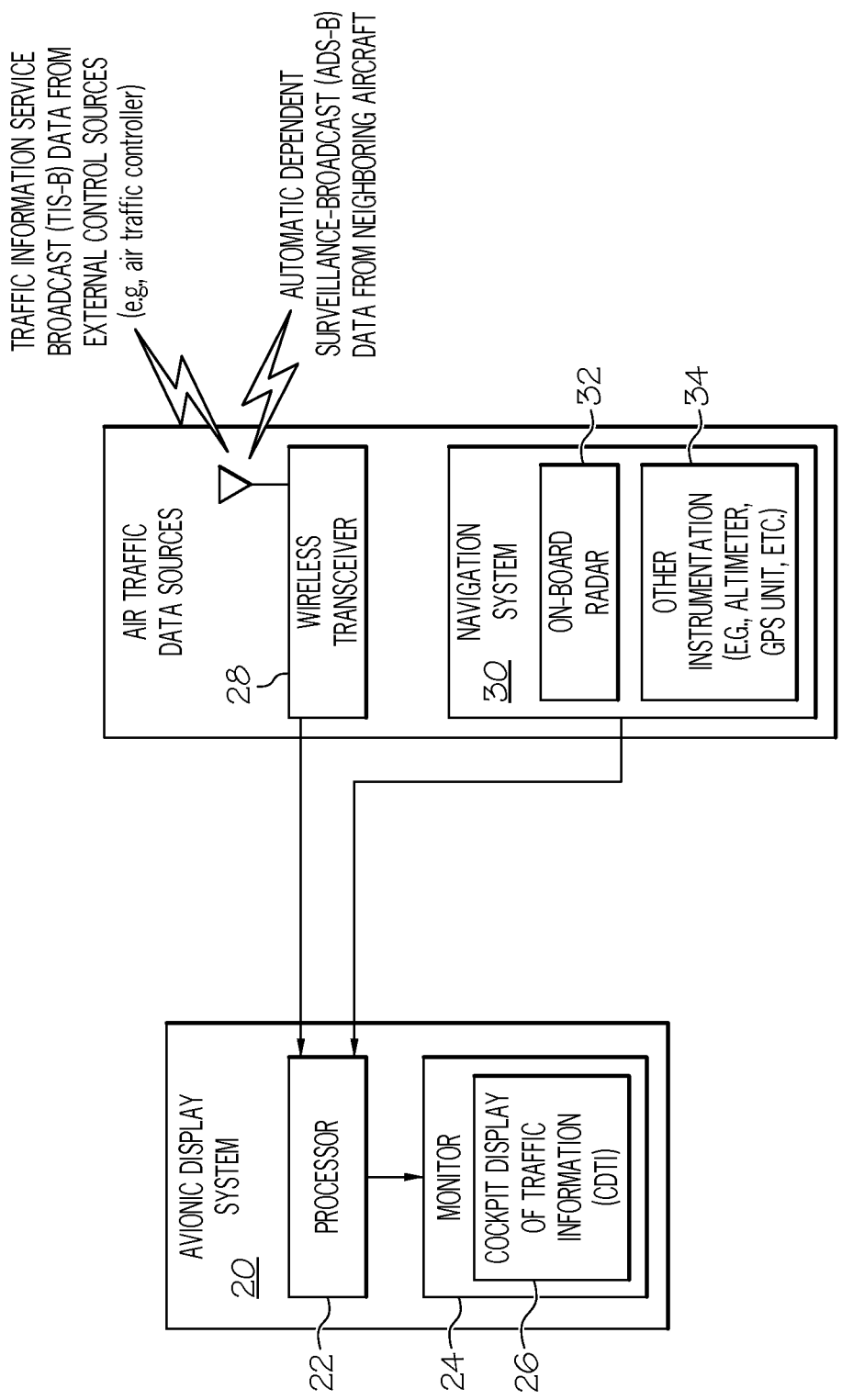
FIG. 1 is a block diagram of a generalized avionics display system in accordance with an exemplary embodiment.

FIG. 1 is functional block diagram that includes a generalized avionics display system 20 in accordance with an exemplary embodiment. Avionics display system 20 includes at least one processor 22 and at least one monitor 24, which is operatively coupled to processor 22. During operation of avionics display system 20, processor 22 drives monitor 24 to produce a graphical display 26 that visually provides a pilot and crew with navigational informational pertaining to the host aircraft and to neighboring aircraft within a predetermined vicinity of the host aircraft. Graphical display 26 may include visual representations of one or more of flight characteristics pertaining to a neighboring aircraft, as described more fully below. Processor 22 may generate display 26 in a two dimensional format (e.g., as a moving map display), in a three dimensional format (e.g., as a perspective display), or in a hybrid format (e.g., in a picture-in-picture or split screen arrangement).

Processor 22 may comprise, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below. Processor 22 is included within a Flight Management Computer of the type commonly deployed within a Flight Management System (FMS).

Image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). Monitor 24 may be disposed at various locations throughout the cockpit. For example, monitor 24 may comprise a primary flight display (PFD) and reside at a central location within the pilot's primary field-of-view. Alternately, monitor 24 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 24 may be worn by one or more members of the flight crew.

Processor 22 includes one or more inputs operatively coupled to one or more air traffic data sources. During operation of display system 20, the air traffic data sources continually provide processor 22 with navigational data pertaining to neighboring aircraft. In the exemplary embodiment illustrated in FIG. 1, the air traffic data sources include a wireless transceiver 28 and a navigation system 30, which are operatively coupled to first and second inputs of processor 22, respectively. Navigation system 30 includes an onboard radar 32 and various other onboard instrumentation 34, such as a radio altimeter, a barometric altimeter, a global positioning system (GPS) unit, and the like. Navigation system 30 may be included within a FMS, and onboard radar 32 may be included within a Terrain Awareness and Warning System (TAWS), such as an Enhanced Ground Proximity Warning System (EGPWS).

With continued reference to FIG. 1, wireless transceiver 28 is considered an air traffic data source in that transceiver 28 receives navigational data from external control sources and relays this data to processor 22. For example, wireless transceiver 28 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 28 may receive Automatic Dependent Surveillance-Broadcast (ADS-B) data from neighboring aircraft. TIS-B data, ADS-B data, and other such external source data is preferably formatted to include air traffic state vector information, which may be utilized to determine a neighboring aircraft's current position and velocity. Furthermore, in accordance with embodiments of the present invention, the TIS-B data and/or the ADS-B may also be formatted to include additional information useful in determining other flight characteristics of the neighboring aircraft including the rate-of-change of the neighboring aircraft's velocity (VROC), i.e., neighboring aircraft's acceleration or deceleration as described more fully below in conjunction with FIGS. 2-9. That is, processor 22 may calculate the VROC using a moving window of samples to determine the rate-of-change over a temporal window.

Figure 2:
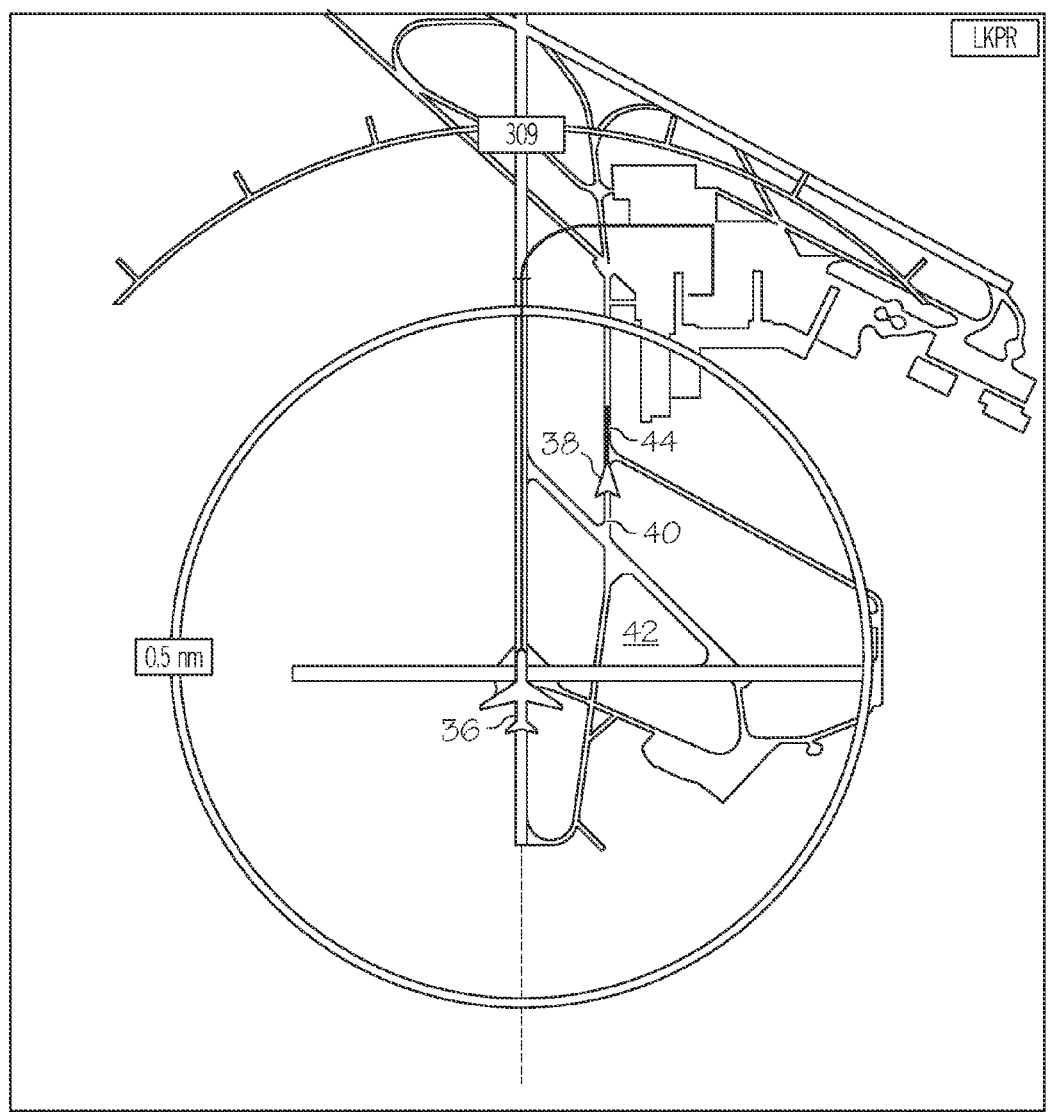
FIG. 2 is a plan view of a typical traffic display graphic of a host aircraft illustrating the velocity vector of a neighboring aircraft.

FIG. 2 illustrates a typical traffic display graphic that may be generated by processor 22 and displayed on monitor 24. As can be seen, the graphic illustrates a host aircraft 36 and a traffic symbol 38 associated with a neighboring aircraft; in this case one that is taxiing on a runway 40 of an airport generally designated 42. Also displayed, is a velocity vector 44 associated with the neighboring aircraft that extends from traffic symbol 38 and indicates the horizontal position of the taxiing aircraft in fifteen seconds. As stated previously, however, the velocity vector does not indicate whether the aircraft represented by symbol 38 is accelerating, decelerating, or maintaining a substantially constant (stable) velocity.

In accordance with an embodiment, processor 22 is configured to utilize multiple samples of velocity data to determine if a neighboring aircraft is accelerating (i.e., exhibiting a positive rate-of-change of velocity), decelerating (i.e. exhibiting a negative rate-of-change of velocity), and/or maintaining a stable velocity. That is, the recent history of velocity readings may be sampled to determine the rate-of-change of velocity over some temporal window, the length of which could be a system configurable parameter or could vary based on operational context. For example, ground-based targets would produce much higher relative increases and decreases in velocity when compared to airborne targets; thus, the temporal window should be shorter for ground targets to maintain sensitivity. Additionally, the rate of change indicator update rate may be configured to accommodate the ADS-B sample rate. It should also be noted that velocity vectors and VROC symbology may be scaled differently for ground and airborne targets since an absolute scale could result in (1) very long velocity vectors for airborne targets with very small VROC graphic indicators that would be difficult for the pilot to discern, and (2) very small velocity vectors and relatively large VROC graphic indicators for ground targets. After determining the rate-of-change of velocity (VROC), processor 22 generates symbology data for transmission to monitor 24 to cause VROC symbology, (a velocity rate-of-change indicator) associated with a neighboring aircraft to be generated on display 26 in the vicinity of that neighboring aircraft's velocity vector. If desired, the VROC may be refreshed or updated at the same rate as its associated velocity; however, this is not a requirement. Alternately, VROC data may be included as part of TIS-B data or ADS-B data. The traffic display system could also be configured to only render VROC on traffic targets that are converging with the host computer vehicle to reduce visual clutter.

The velocity vector 44 is a predictive indication of the horizontal position of aircraft 38 in fifteen seconds based on momentary velocity (FIG. 2). In accordance with an embodiment, the VROC graphic indicator is a categorical indication based on the rate of acceleration or deceleration and momentary velocity. The magnitude of the acceleration or deceleration may be based on the momentary vector magnitude (44 in FIG. 2) over the same fifteen second period; i.e. the percent change in velocity given (a) the momentary velocity, and (b) the acceleration/deceleration. As an example, a 0-10 percent change may be considered stable, a 10-30 percent change may be considered a low change, a 30-65 percent change may be considered a moderate change, and a change greater than 65 percent may be considered a high change.

Figure 3:
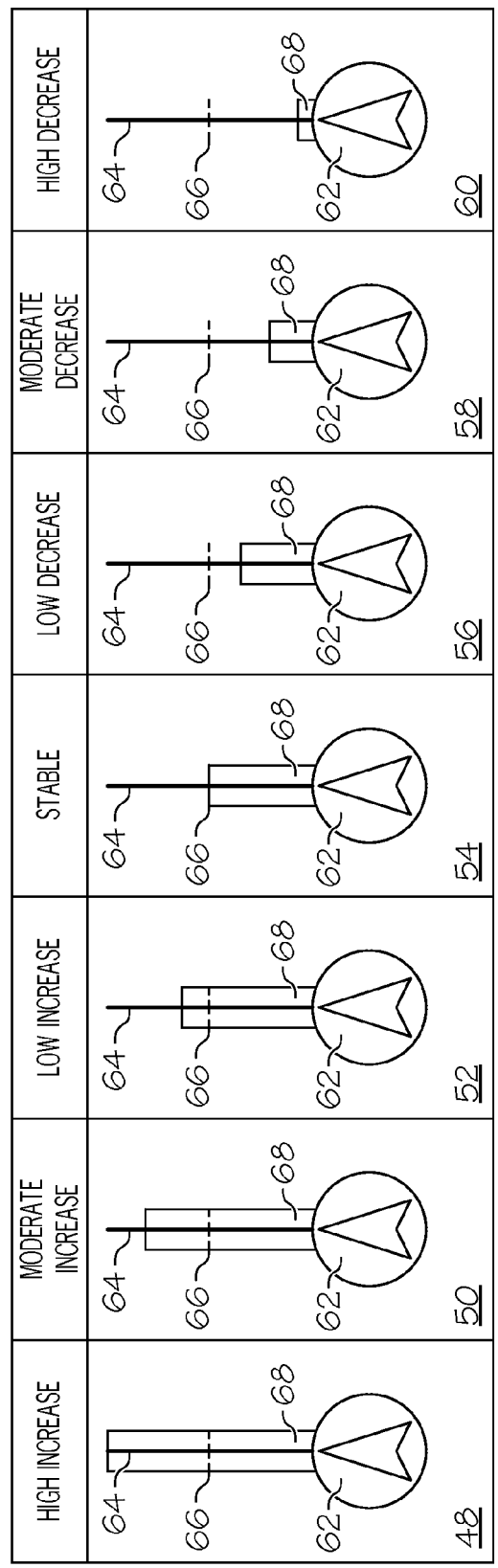
FIG. 3 illustrates an embodiment of a first symbology scheme for graphically displaying a velocity rate-of-change graphic on a display.

One embodiment of a graphical symbology scheme capable of being generated by processor 22 for generator on display 26 of monitor 24 is shown in FIG. 3. The symbology in boxes 48, 50, 52, 54, 56, 58 and 60 each include a traffic symbol 62, a velocity vector 64, a substantially zero-acceleration/deceleration marker 66, and a VROC indicator bar 68 that extends along velocity vector 64. Bar 68 may, for example, be shaded, cross-marked, or colored, so as to be easily discernable while maintaining velocity vector 64 visible. The length of bar 68 is representative of the amount of acceleration or deceleration of the neighboring aircraft. For example, in box 48, VROC indicator 68 extends far beyond marker 66 thus indicating a high acceleration (e.g. above 65%). VROC indicator 68 in box 50 indicates a moderate (e.g. 30-65%) acceleration, while the symbology in box 52 represents a low (e.g. 10-30%) acceleration. Box 54 illustrates the symbology associated with would be considered a stable condition; that is, the acceleration or deceleration is less than 10%. In this case, the VROC indicator graphic (bar 68) extends proximately to the zero acceleration/deceleration marker 66.

In boxes 56, 58, and 60, the bar 68 extends slightly below, moderately below, and significantly below, marker 66 to indicate a low decrease (10-30%), a moderate decrease (30-65%), and a high decrease (greater than 65%), respectively, in acceleration.

Figure 4:
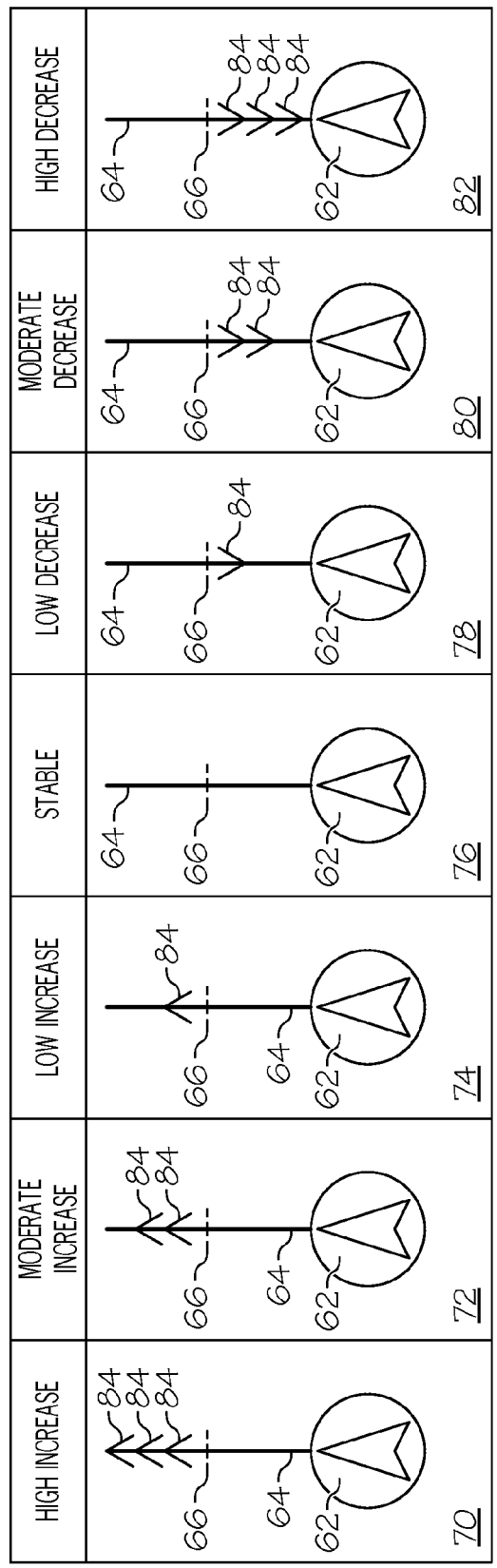
FIG. 4 illustrates an embodiment of a second symbology scheme for graphically displaying a velocity rate-of-change graphic on a display.

FIG. 4 illustrates another embodiment of a graphical symbology scheme capable of being generated by processor 22 for generation on display 26 of monitor 24. Like elements are denoted with like reference numerals. In this case, the VROC indicator comprises a pattern of chevrons on velocity vector 64 as described below. Referring to block 70, three chevrons 84 (above marker 66 in FIG. 4) pointed toward the end of velocity vector 64 represent a high increase in acceleration, whereas, two chevrons 84 and one chevron 84 in boxes 72 and 74, respectively, indicate moderate and low increases, respectively, in acceleration. The absence of chevrons on velocity vector 64 in block 76 indicates a stable condition. A single chevron 84 on velocity vector 64 below marker 66 and pointed toward traffic symbol 62 represents a low decrease in acceleration. Two chevrons (box 80) and three chevrons (box 82) below marker 66 and oriented toward traffic symbol 62 present moderate and high decreases, respectively in acceleration.

Figure 5:
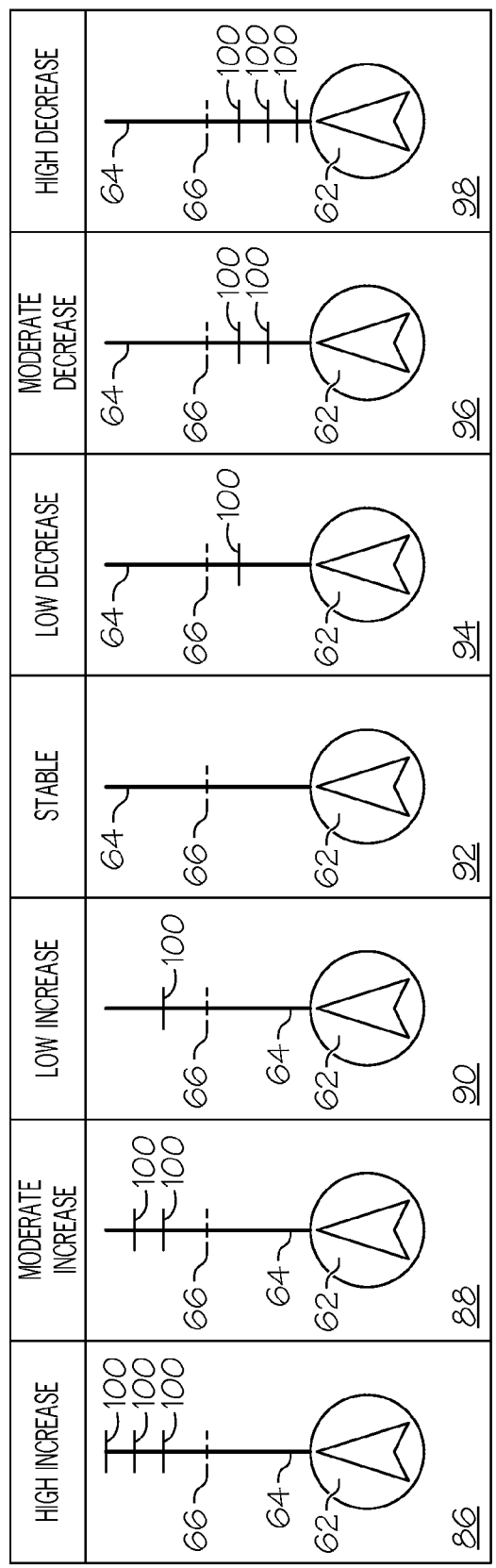
FIG. 5 illustrates an embodiment of a third symbology scheme for graphically displaying a velocity rate-of-change graphic on a display.

In FIG. 5, the VROC indicator comprises one or more lines 100 through velocity vector 64 and substantially perpendicular thereto. As can be seen, the symbology in block 86, 88, and 90 comprise three such lines, two such lines, and one such line, above marker 66 indicating high, moderate, and low increases, respectively, in acceleration. Blocks 94, 96, and 98 comprise one such line, two such lines and three such lines, indicating low, moderate, and high decreases, respectively, in acceleration. The absence of such lines in block 92 indicate a substantially stable velocity.

Figure 6:
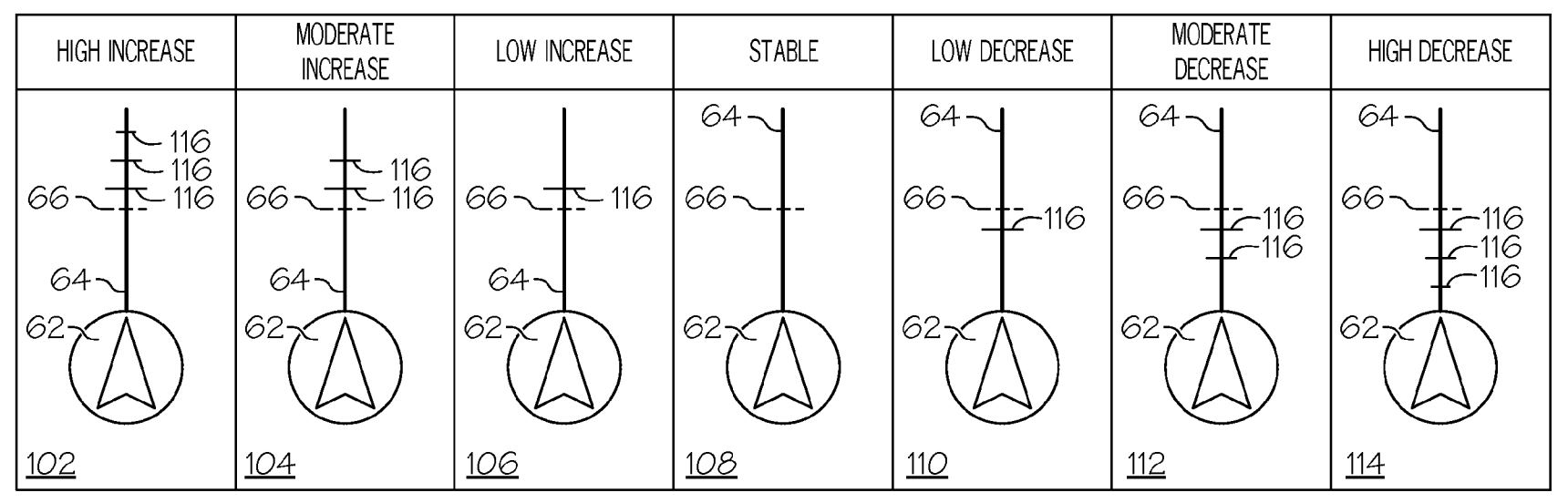

FIG. 6 illustrates a symbology scheme similar to that shown in FIG. 5 where like reference numerals represent like elements. In this case, the lines 116 intersecting the velocity above marker 66 are of unequal length, as are the intersecting lines 116 below marker 66.

Figure 7:
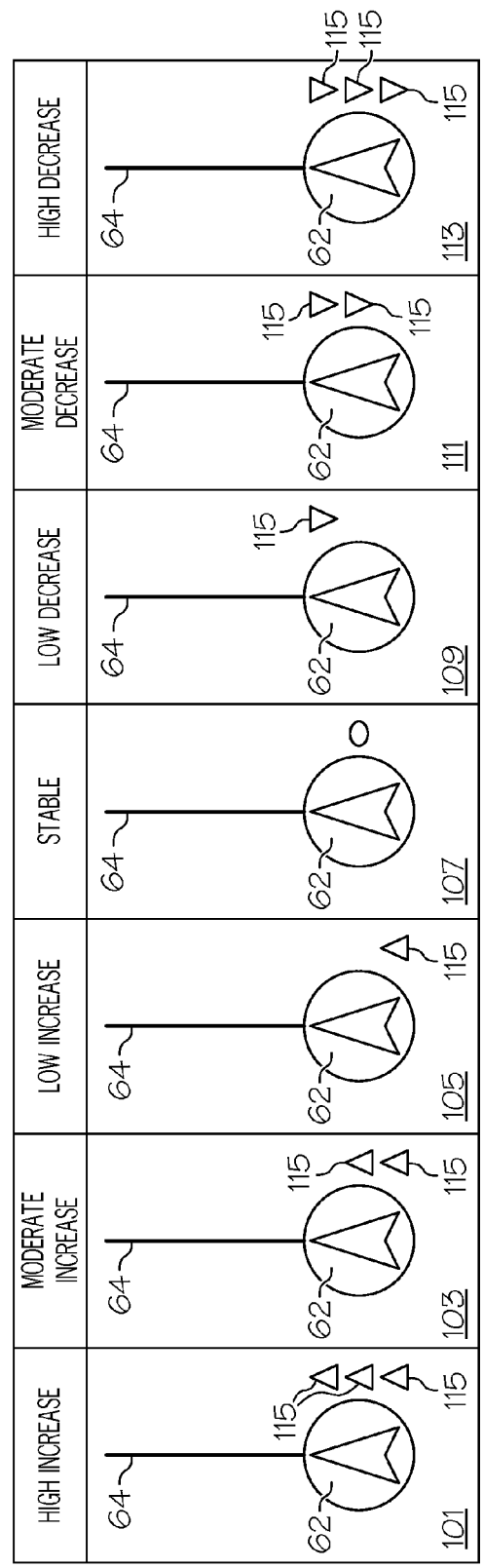
FIG. 7 illustrates an embodiment of a fifth symbology scheme for graphically displaying a velocity rate-of-change graphic on a display.

FIG. 7 illustrates yet another embodiment of a graphical symbology scheme capable of being generated by processor 22 for viewing on display 26 of monitor 24. Like elements are again denoted with like reference numerals. In this case, the VROC indicator comprises one or more triangles adjacent the traffic symbol 62. If desired, they could also be generated alongside velocity vector 64. Referring to blocks 101, 103, and 105, three upward pointing triangles 115, two upward pointing triangles 115, and one upward pointing triangle 115, represent high, moderate, and low increases, respectively, in the velocity rate-of-change. Similarly, referring to blocks 109, 111, and 113, three downward pointing triangles 115, two downward pointing triangles, and one downward pointing triangle 115, represent high, moderate, and low decreases, respectively, in the velocity rate-of-change. Oval symbol 117 adjacent traffic symbol 62 in block 107 indicates a stable condition as described above.

Figure 8:
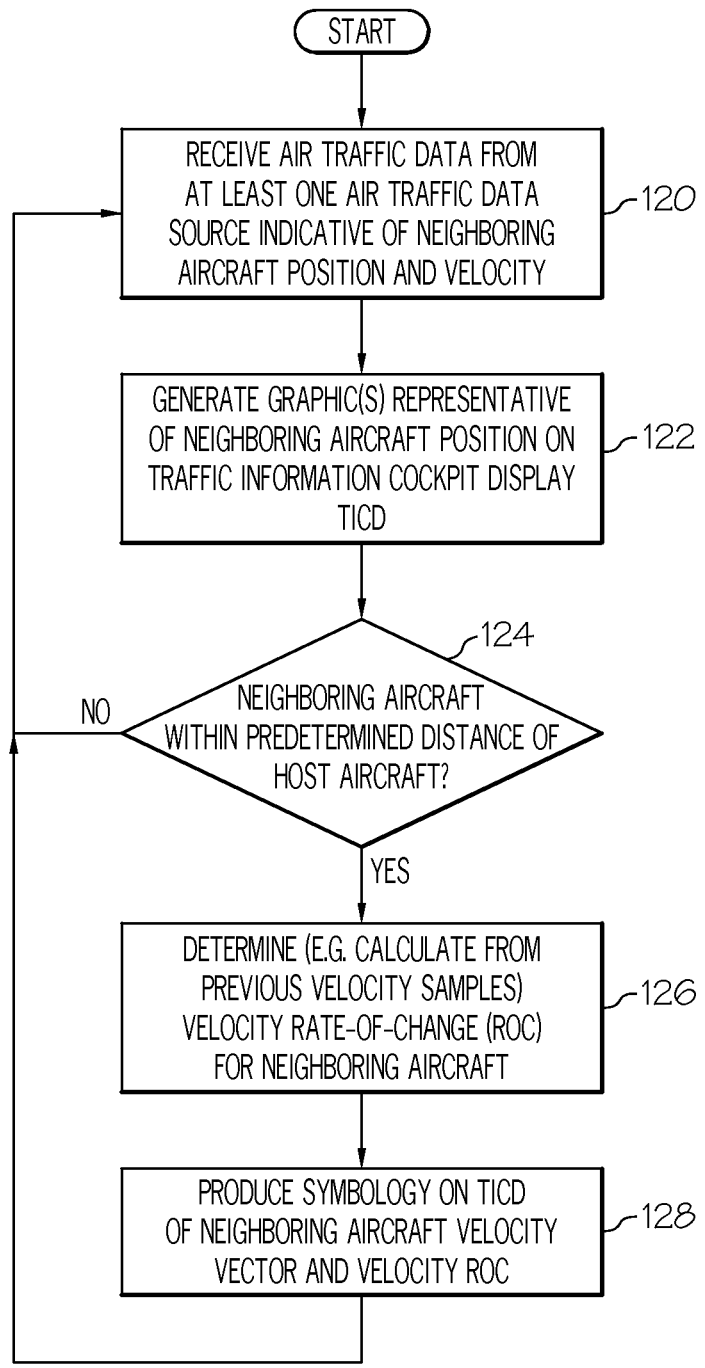
FIG. 8 is a flow-chart illustrating a method for generating a velocity rate-of-change graphic associated with a neighboring aircraft and graphically representing the velocity rate-of-change graphic on an avionics display.

FIG. 8 is a flow chart illustrating an exemplary method that may be carried out by processor 22 (FIG. 1) to generate a velocity rate-of-change indicator on monitor 24 (FIG. 1). To commence (STEP 120), avionics display system 20 receives air traffic data from at least on source (e.g. ADS-B, TIS-B, etc.) indicating the position and velocity of neighboring aircraft. Next, in STEP 122, processor 22 generates graphics information representative of the neighboring aircraft's position and provides such information to monitor 24 for display on a traffic information cockpit display (TICD). In addition to only considering converging traffic target for inclusion of VROC, the system could further filter impacted traffic based on distance from the host aircraft (STEP 124), before processor 22 determines the rate-of-change in velocity (VROC) (i.e. acceleration, deceleration) of the neighboring aircraft (STEP 126). That is, processor 22 calculates the VROC from current and previously stored velocity samples. Finally, processor 22 generates symbology on display 26 corresponding to the neighboring aircraft's velocity vector (FIGS. 2-7) and VROC indicator, (STEP 128).

Figure 9:
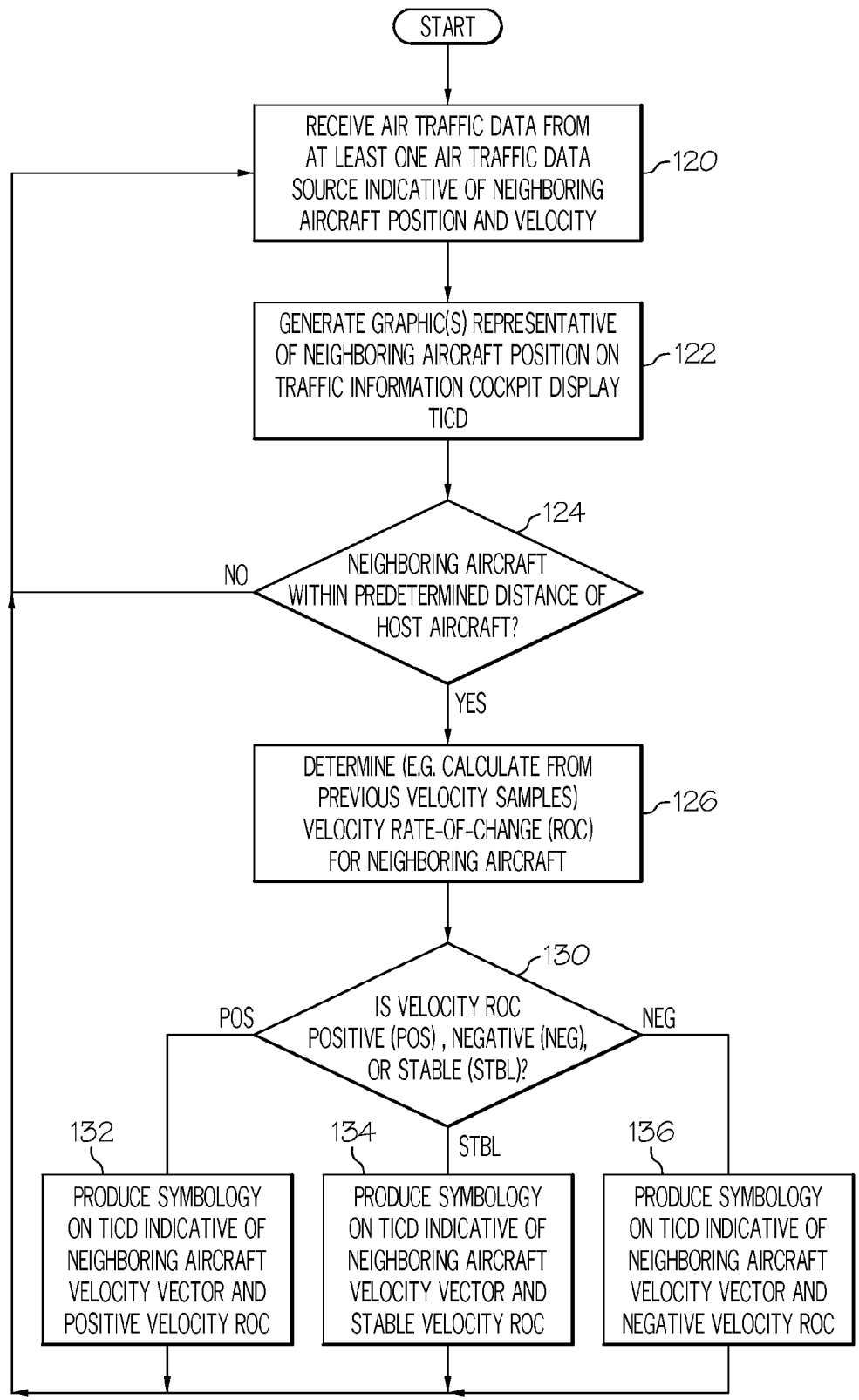
FIG. 9 is a flow-chart illustrating an enhanced method for generating a velocity rate-of change graphic associated with a neighboring aircraft and graphically representing the velocity rate-of-change graphic on an avionics display.

The method described in conjunction with the flow chart shown in FIG. 8 may be enhanced as shown in the flow chart of FIG. 9 where like steps are denoted with like reference numerals. That is, in addition to determining the VROC as described in connection with STEP 26 in FIG. 8, processor 22 may also determine if the VROC is positive (i.e. the neighboring aircraft is accelerating), negative (i.e. the neighboring aircraft in decelerating), or stable (i.e. the neighboring aircraft is neither substantially accelerating or decelerating). If the VROC is positive, the symbology produced by processor 22 will so indicate (STEP 132). If the velocity ROC is stable or negative, the symbology produced by processor 22 will so indicate (STEP 134 and STEP 136, respectively). Furthermore, as described previously, the categorical process described in connection with FIG. 9 may be enhanced as described above. That is, the symbology generated by processor 22 may also give an indication of the degree to which a neighboring aircraft is accelerating or decelerating; i.e. high, moderate, or low as shown in FIGS. 3-7.

Thus, there has been provided a system and method for enabling a pilot to rapidly discern not only the horizontal position of a neighboring aircraft and its projected position in fifteen seconds, but also provides an indication of the stability of the neighboring aircrafts velocity vector.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying the velocity rate-of-change (VROC) of at least one neighboring aircraft on a cockpit monitor included within a cockpit display system of a host aircraft, the cockpit display system receiving and displaying position and velocity data pertaining to the neighboring aircraft on the cockpit monitor as a position symbol and a velocity vector graphic, respectively, the method comprising:
   determining the VROC of the neighboring aircraft;
   generating a marker on the velocity vector that separates a first region on the velocity vector that visually represents a positive VROC from a second region on the velocity vector that visually represents a negative VROC;
   generating VROC symbology on the cockpit display at a location along the velocity vector that is indicative of the neighboring aircraft's VROC, wherein the VROC symbology comprises a plurality of symbols, the number and location of which visually represent a discreet range of VROC.

2. A method according to claim 1 wherein the marker visually represents a substantially zero VROC.

3. A method according to claim 1 wherein the VROC symbology is a bar extending from the position symbol and along the velocity vector, the location of the end of the bar on the velocity vector visually representing the VROC of the neighboring aircraft.

4. A method according to claim 1 wherein the VROC symbology comprises at least one line that intersects the velocity vector at a location that visually represents the VROC of the neighboring aircraft.

5. A method according to claim 1 wherein the VROC symbology comprises at least one chevron on the velocity vector that usually represents the VROC of the neighboring aircraft.

6. A method according to claim 1 further comprising generating VROC symbology substantially adjacent to the velocity vector.

7. A method carried out by a cockpit display system including a cockpit monitor, the method comprising:
   receiving air traffic data from at least one traffic data source indicative of the position and velocity of at least one neighboring aircraft;
   determining the velocity rate of change (VROC) of the neighboring aircraft from the air traffic data;
   generating an air traffic display on the cockpit monitor including symbology indicative of (1) the current position of the neighboring aircraft, (2) the velocity vector of the neighboring aircraft, and (3) a marker on the velocity vector that separates a first region on the velocity vector that visually represents a positive VROC from a second region on the velocity vector that visually represents a negative VROC; and
   generating VROC symbology on the cockpit display at a location along the velocity vector that is indicative of the neighboring aircraft's VROC, wherein the VROC symbology comprises a plurality of symbols, the number and location of which visually represent a discreet range of VROC.

8. A method according to claim 7 wherein the marker visually represents a substantially zero VROC.

9. A method according to claim 8 wherein the VROC symbology is a bar extending from the position symbol and along the velocity vector, the location of the end of the bar on the velocity visually representing the VROC of the neighboring aircraft.

10. An avionics display system for deployment onboard an aircraft including an air traffic data source that provides the avionics display system with data indicative of at least position and velocity of a neighboring aircraft, the system comprising:
    a cockpit display system;
    a monitor included within the cockpit display system, the cockpit display system receiving and displaying position and velocity data pertaining to the neighboring aircraft on the cockpit monitor as a position symbol and a velocity vector graphic; and
    a processor operatively coupled to the monitor and configured to generate an air traffic display on the monitor including symbology indicative of (1) the current position of the neighboring aircraft, (2) the velocity of the neighboring aircraft, (3) a marker on the velocity vector that separates a first region on the velocity vector that visually represents a positive VROC from a second region on the velocity vector that visually represents a negative VROC, and (4) VROC symbology at a location along the velocity vector that is indicative of the neighboring aircraft's VROC, wherein the VROC symbology comprises a plurality of symbols, the number and location of which visually represent a discreet range of VROC.

* * * * *